United States Patent [19]

Cuschera

[11] Patent Number: 4,962,940
[45] Date of Patent: Oct. 16, 1990

[54] HAND TRUCK UNDER-CARRIAGE FOR ENGAGING STAIRS OR THE LIKE

[76] Inventor: Casper Cuschera, 967 Industrial Pkwy. West, Hayward, Calif. 94544

[21] Appl. No.: 306,056

[22] Filed: Feb. 6, 1989

[51] Int. Cl.⁵ ............................................. B62B 5/02
[52] U.S. Cl. .................................. 280/5.22; 180/9.1; 305/17
[58] Field of Search ................ 280/5.2, 5.22, 32, 844, 280/DIG. 10; 305/16, 17, 18; 180/9.1, 9.22

[56] References Cited

U.S. PATENT DOCUMENTS

| | | | |
|---|---|---|---|
| 1,583,114 | 5/1926 | Bierly | 280/844 |
| 1,960,234 | 5/1934 | Eckels | 280/844 |
| 2,193,283 | 3/1940 | Harberson | 280/5.22 |
| 2,260,027 | 10/1941 | Hotson | 280/841 |
| 2,301,341 | 11/1942 | Stevens et al. | 280/5.22 |
| 2,620,041 | 12/1952 | Chenette et al. | 180/9.1 |
| 2,775,463 | 12/1956 | Chenette | 280/5.22 |
| 2,820,643 | 1/1958 | Cohn | 280/5.22 X |
| 4,136,888 | 1/1979 | Bowie, Jr. et al. | 280/5.22 |
| 4,290,618 | 9/1981 | Morton | 280/5.22 |
| 4,531,752 | 7/1985 | Diener | 280/5.22 X |

FOREIGN PATENT DOCUMENTS

| | | | |
|---|---|---|---|
| 343909 | 11/1921 | Fed. Rep. of Germany | 280/844 |
| 1003703 | 9/1965 | United Kingdom | 280/5.22 |

*Primary Examiner*—Charles A. Marmor
*Assistant Examiner*—Brian L. Johnson
*Attorney, Agent, or Firm*—Harris Zimmerman

[57] ABSTRACT

A pair of endless belt track assemblies attach to the frame of a hand truck and extend backwards from the ground wheels for a distance to facilitate travel on stairs or the like during the intervals when the ground wheels are out of contact with the stair treads. Rollers are situated between the front, back, lower and upper regions of a pair of spaced apart side plates and are spaced from the edges of the plates to define a continuous belt guideway between the peripheral regions of the side plates. An endless belt is seated in the guideway in continuous contact with each of the rollers and functions as a crawler track when the truck wheels are out of contact with the stairs. The construction reduces resistance to belt movement from friction and inhibits jamming of the rollers and snagging of the belt.

10 Claims, 2 Drawing Sheets

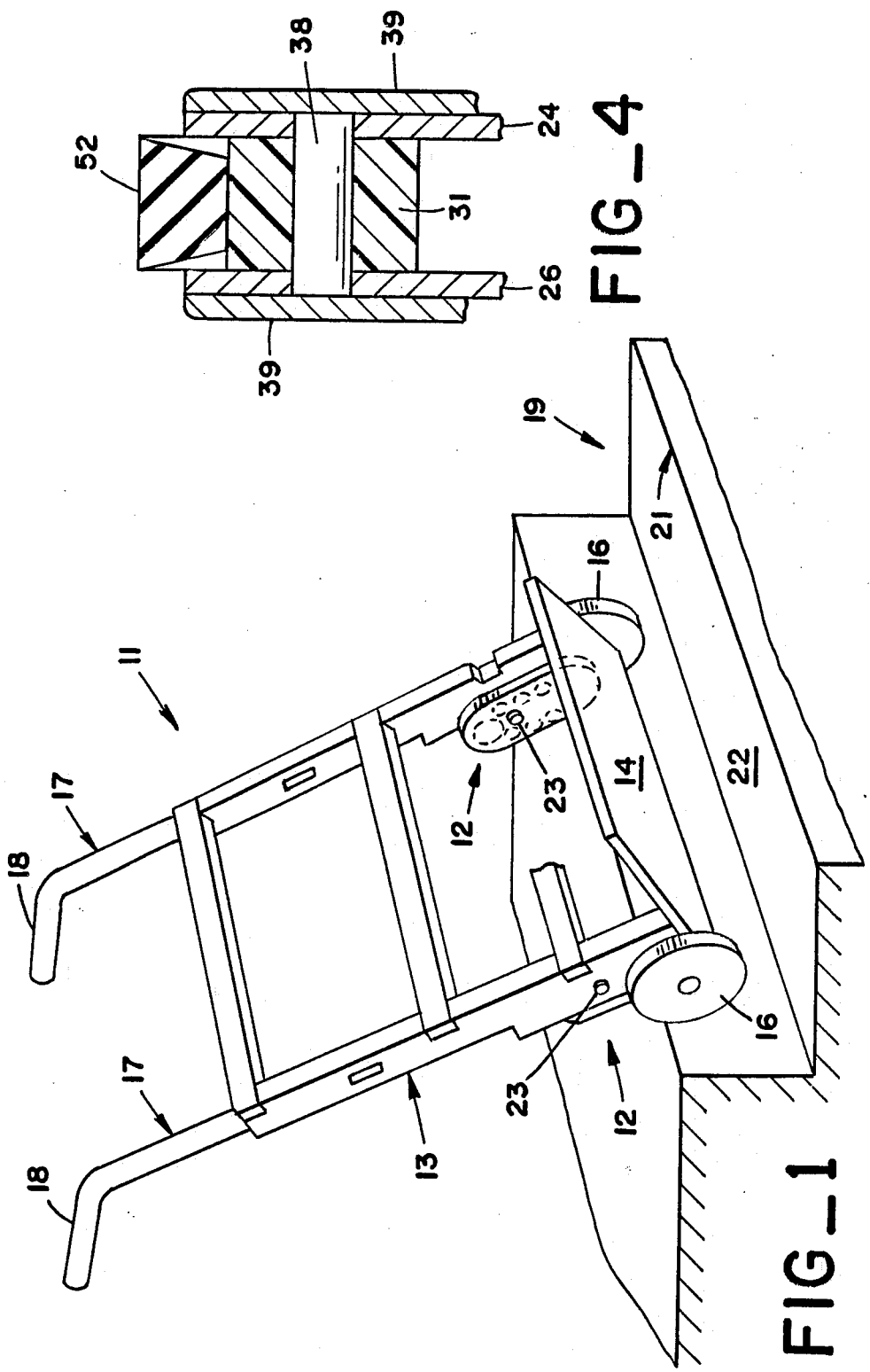

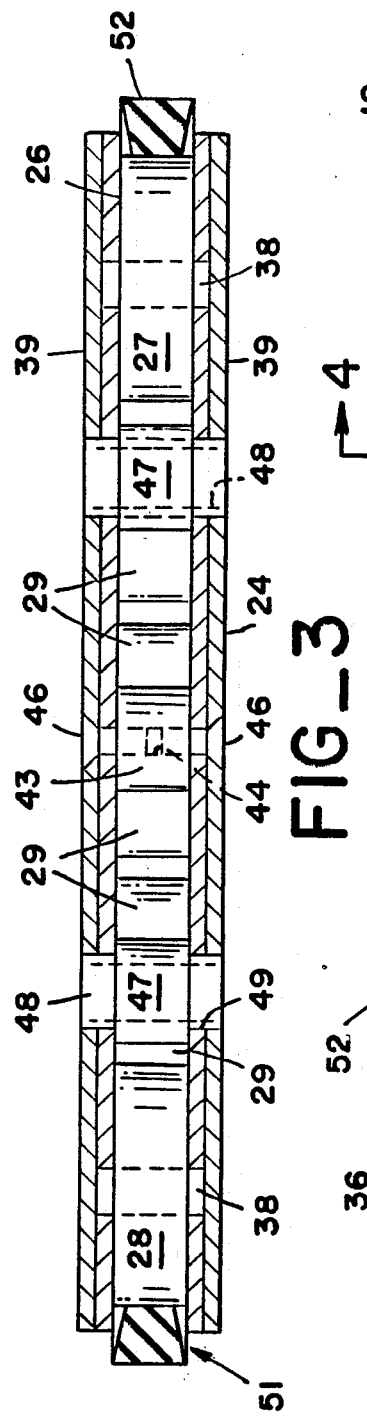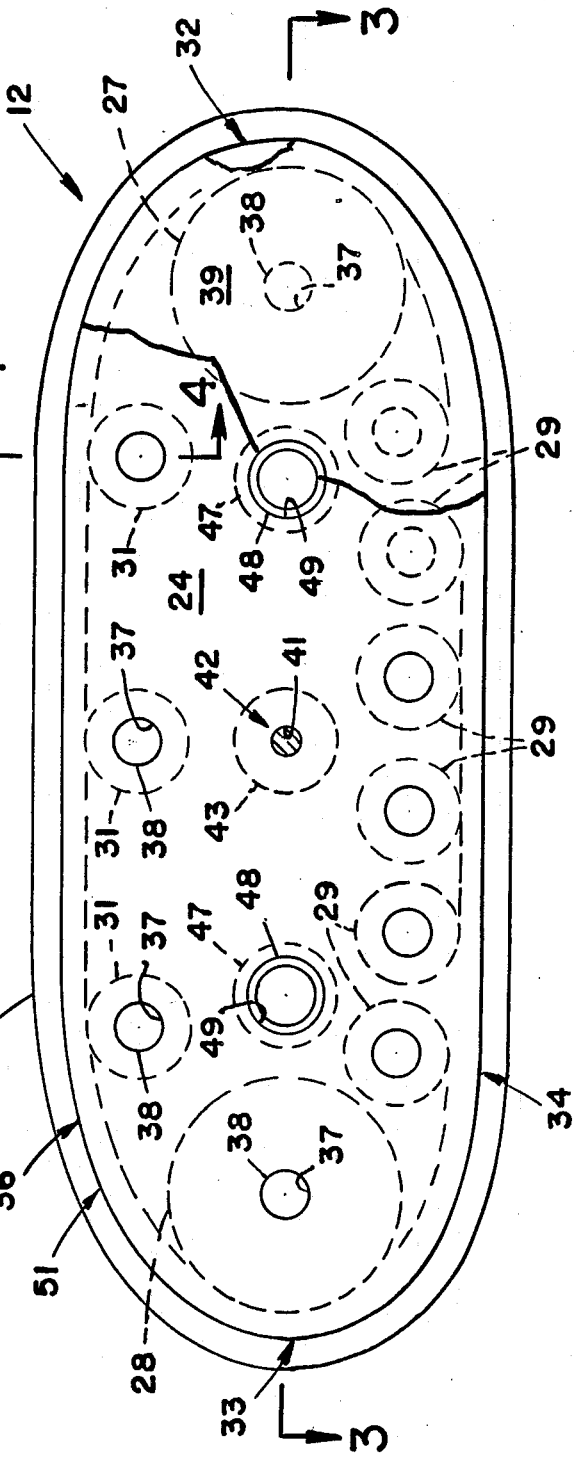

HAND TRUCK UNDER-CARRIAGE FOR ENGAGING STAIRS OR THE LIKE

TECHNICAL FIELD

This invention relates to manually operated hand trucks for moving heavy objects and more particularly to endless belt track assemblies which support the lower end of a hand truck while ascending or descending stairs, curbs or the like.

BACKGROUND OF THE INVENTION

Hand trucks typically have a frame for supporting a load which is to be moved, a pair of wheels at the lower end of the frame and hand grips at the upper end. The operator holds the frame in an inclined position and pushes or pulls on the hand grips to maneuver the load from one location to another.

The traditional hand truck construction is well suited for moving objects along a floor or other level surface but becomes more difficult to handle when the load must be moved up or down stairs, across a curb or along some other discontinuous surface. During portions of such travel, it is the frame rather than the wheels that contacts the underlying surface. This creates high friction and resistance to movement of the truck and can also damage flooring, carpets or the like. Movement of the truck wheels off of the edges of stair treads also tends to generate jarring movements of the truck which complicate the operator's task and which can damage fragile loads.

These problems can be avoided by equipping the truck with a pair of endless belt track assemblies each of which extends backward for a distance along the underside of the frame behind a separate one of the ground wheels. The belt bears against a series of rollers situated along the underside of the track assembly and carries the weight of the truck during periods when the ground wheels are out of contact with the stair or other underlying surface. Prior U.S. Pat. Nos. 4,290,618 and 2,193,283 disclose examples of such track assemblies for hand trucks. Prior U.S. Pat. No. 4,136,888 discloses another form of track assembly of this kind on a transport chair for invalids rather than on a hand truck. U.S. Pat. No. 2,620,041 describes a large motor driven track assembly designed to replace the ground wheels rather than to supplement such wheels.

The arrangements of rollers, pulleys, guideways and the like which have heretofore been used to support and position the endless belt are not optimal from the standpoint of reducing frictional resistance to belt movement and can be prone to jamming. In some cases, the belt rides against fixed surfaces of the assembly that create high friction. Support rollers in some cases are situated in constricted spaces that can accumulate debris which increases friction and may cause jamming or binding. In some prior constructions, the belt is deliberately chosen to be larger than its guideway apparently in an effort to minimize frictional resistance. A loosely fitted belt of this kind can hang down during normal travel of the truck creating a loop which can snag on object along the route of travel. The hanging loop also presents a sizable opening through which debris can enter the roller mechanism.

The present invention is directed to overcoming one or more of the problems discussed above.

SUMMARY OF THE INVENTION

In one aspect, the present invention provides a track assembly for facilitating movement of a hand truck on stairs or the like, the hand truck being of the type which has a frame for supporting loads, ground wheels at the lower end of the frame and hand grips attached to the upper portion of the frame. The track assembly includes a pair of parallel, spaced apart side plates having front and back ends of rounded configuration and which are of greater length than height. A plurality of rollers are situated between the side plates and are journalled for rotation about fixed axes that are normal to the plates. The rollers include a front roller located between the front regions of the plates, a back roller between the back regions of the plates, a plurality of lower rollers along the lower regions of the plates and a plurality of upper rollers along the upper regions. Each of the rollers is spaced from the edges of the side plates to define a continuous belt guideway between the peripheral regions of the plates. An endless belt is seated in the guideway and has an inner surface which continuously contacts each of the rollers within the guideway, the inner surface being out of contact with the side plates and other non-rotatable components of the assembly. Means are provided for securing the track assembly to the hand truck at a location where it extends rearwardly along the truck frame from the region of the ground wheels.

In another aspect, the invention provides apparatus for facilitating travel of a hand truck on stairs or the like, the truck being one which has a load supporting frame, a pair of ground wheels at the base of the frame and hand grip means for manually holding the frame in a semi-upright orientation during travel. The apparatus includes a pair of track assemblies each of which is secured to the truck frame behind a separate one of the ground wheels and which extends backward from the wheels. Each track assembly has a pair of spaced apart, parallel, flat side plates and a plurality of rollers between the side plates which are journalled to the plates for rotation about fixed parallel axes that are normal to the plates. The rollers include front and back end rollers located near the extremities of the plates, a series of lower rollers near the lower edges of the plates and a series of upper rollers near the upper edges of the plates, the rollers being positioned to define a continuous belt guideway in conjunction with the peripheral region of the plates. Each of the track assemblies further includes an endless belt seated in the guideway along the entire length of the belt. The inner surface of the belt is in continuous contact with each of the rollers within the guideway and is free of contact with other structure, the outer surface of the belt being outside the guideway.

The invention facilitates passage of a hand truck up or down stairs, curbs or the like by reducing friction and jarring during periods when the ground wheels of the truck are out of contact with the underlying stair treads or other surface. The track assemblies of the present invention extend backward along the truck frame behind the ground wheels and support the truck until such time as the ground wheels re-contact the stair treads or the like. The endless belt of each track assembly rides against low friction rollers around its entire path of travel and remains in contact with each roller at all stages of operation. The belt remains seated in a guideway throughout its length thereby inhibiting snagging and entrance of debris into the region of the internal roller mechanism. The construction does not situate the rollers in constricted areas where entrapped debris might cause increased friction or binding.

BRIEF DESCRIPTION OF THE DRAWINGS

FIG. 1 is a perspective view of a hand truck equipped with a preferred embodiment of the invention, the truck being shown in the process of passage down a staircase.

FIG. 2 is a partially broken out side elevation view of a track assembly of the hand truck of FIG. 1.

FIG. 3 is an plan section view of the mechanism of FIG. 2 taken along line 3—3 thereof.

FIG. 4 is an elevation section view of a portion of the mechanism of FIG. 2 taken along line 4—4 thereof.

DETAILED DESCRIPTION OF THE PREFERRED EMBODIMENT

Referring to FIG. I of the drawings, a hand truck 11 equipped with track assemblies 12 in accordance with the present invention typically has a load supporting frame 13 including a projecting shelf 14 at the bottom and one of a pair of ground wheels 16 is journalled to each side of the base of the frame. Arms 17, terminating in hand grips 18 extend upward from each side of the frame 13. These components may have a variety of different specific constructions in different models of hand truck 11.

Loads which are to be carried are placed on shelf 14 and usually are also secured to the frame 13 with flexible straps or the like in a known manner that is not depicted in the drawing. The operator then grasps hand grips 18, holds the truck 11 in a semi-upright orientation and pushes or pulls on the hand grips to travel the truck from one location to another. The base of the truck 11 rides on ground wheels 16 when the truck is in the semi-upright orientation provided that the underlying surface is flat and continuous. The ground wheels 16 may be temporarily out of contact with the underlying surface while ascending or descending a staircase 19 or other discontinuous surface. In the absence of track assemblies 12, the underside of frame 13 must drag along the edge 21 of each stair tread 22 during such periods and abrupt impacts tend to occur each time that the wheels 16 drop off or encounter a tread edge 21.

Each track assembly 12 is secured to the frame 13, by a pair of bolts 23, at a location behind one of the wheels 16 and extends backward along the underside of the frame for a distance sufficient to cause the truck 11 to ride on the track assemblies during the intervals when ground wheels 16 are out of contact with a stair tread 22. The track assemblies 12 are preferably proportioned to extend down from frame 13 a distance which is slightly smaller than the distance that the ground wheels 16 extend down from the frame. This assures that the track assemblies 12 remain out of contact with an underlying floor or other level surface when the truck is riding on ground wheels 16.

Referring jointly to FIGS. 2 and 3 each track assembly 12 has a pair of flat side plates 24 and 26 of similar configuration which are spaced apart a distance sufficient to enable a number of rollers 27, 28, 29 and 31 to be journalled in the regions between the side plates. Each side plate 24 and 26 has rounded front and back ends 32 and 33 respectively, a lower edge 34 which is preferably linear except at the end regions and an upwardly bowed arcuate upper edge 36 Side plates 24, 26 which are about ten and one half inches (27 cm) in length will accommodate to most staircases although longer or shorter track assemblies may be appropriate under some circumstances. The height of the side plates 24, 26 at their centers is preferably smaller, three and three fourth inches (9.5 cm) in this particular instance, to accommodate to the diameter of typical hand truck ground wheels.

Both side plates 24 and 26 are transpierced by a plurality of matching apertures 37 which seat opposite ends of a plurality of axle pins 38 to journal the rollers 27, 28, 29 and 31 for rotation about parallel axes that extend transversely relative to the side plates. Each such roller 27, 28, 29 and 31 is cylindrical and, as best seen by reference to FIG. 4, is engaged on one of the axles pins 38 in coaxial relationship to the pin. Alternately, the axle pins 38 may be replaced by small diameter axial extensions formed integrally on the rollers.

To cover the apertures 37 and to strengthen the track assembly 12, with reference again to FIGS. 2 and 3, outer plates 39 are disposed against the outside surfaces of each of the side plates 24 and 26, the outer plates having a shape similar to that of the side plates except for the absence of apertures 37.

The plates 24, 26 and 39 each have an additional aperture 41 situated midway between the ends 32 and 33 of the plates to receive the fastening means 42 for securing the components of the track assembly together. The fastening means 42 includes a cylindrical bushing 43 situated between the side plates 24 and 26 at the location of apertures 41, the bushing having a threaded axial passage 44. The apertures 41 of both outer plates 39 are tapered to form seats for the heads of threaded screws 46 which engage in the threaded axial passage 44 of bushing 43 in order to secure the plates 24, 26 and 39 together. The plates 24, 26 and 39 are held in register with each other by a pair of tubular spacer members 47 one of which is situated approximately midway between bushing 43 and the front end 32 of the plates and the other of which is approximately midway between bushing 43 and the back end 33 of the plates. Each such spacer member 47 has an extension 48 at each end that is of reduced diameter and which extends into conforming openings 49 in the plates 24, 26 and 39.

Rollers 27, 28, 29 and 31 in conjunction with the peripheral region of side plates 24 and 26 define a guideway 51 for an endless belt 52 of the v-belt type which extends around the periphery of the track assembly 12 and which functions in the manner of a crawler track when the hand truck is riding on the track assemblies. For this purpose, each of the rollers 27, 28, 29 and 31 is equidistantly spaced from the periphery of the side plates 24 and 26 by a distance which is less than the thickness of belt 52. The front end and back end rollers 27 and 28 are larger than the lower and upper rollers 29 and 31 and have a radius which is smaller than that of the rounded ends 32 and 33 of side plates 24, 26 by an amount which is less than the thickness of belt 52 thereby causing the inner surface of the belt to be seated within guideway 51 as the belt travels around the ends of the assembly 12.

The lower rollers 29, of which there are six in this particular example of the invention, are spaced apart in a row along the lower region of the side planes 24, 26 with the rollers 29 at each end of the row being at a slightly higher elevation than the others to conform with the rounded profile of the side plates 24, 26 at their end regions.

Three upper rollers 31 are provided in this example with the center roller being at a slightly higher elevation than the others. This conforms the belt guideway 51 with the upwardly bowed arcuate configuration of the side plates 24, 26. The upper and lower rollers 31 and 29 are preferably vertically spaced apart a distance which causes the tops of upper rollers to be spaced from the bottoms of the lower rollers by an amount which exceeds the diameter of the front and back rollers 27 and 28. This roller placement aids in holding the belt 52 taut against each of the rollers 27, 28 and 29 along the guideway. It should be recognized that different numbers of upper rollers 31 and lower rollers 29 can be provided in other embodiments of the invention.

The components of the track assemblies 12 can be formed of any of a variety of materials but it is advantageous from the standpoint of providing a high strength construction while minimizing frictional resistance to belt travel if the plates 24, 26 and 39 are high strength metal such as steel while the rollers 27, 28, 29 and 31 are formed of a high strength plastic that has low coefficient of friction such as nylon or teflon.

Referring jointly to all figures of the drawings, the track assemblies 12 reduce friction at times when the ground wheels 16 are out of contact with the underlying stair treads 22 as the pressure exerted against the belts 52 by the weight of the truck acting against the edge 21 of the preceding tread causes the belts to travel around the track assemblies 12 to the extent necessary to avoid any sliding contact of the assemblies with the tread edge. The belt 52 itself bears only on rotatable elements, rollers 27, 28, 29 and 31, throughout its travel which create relatively little frictional resistance to belt motion. The inner surface of the belt 52 remains seated in guideway 51 throughout its length under all conditions including when the hand truck is riding on ground wheels 16 and the track assemblies are inactive and thus does not tend to snag on objects. The continuous seating of the belt 52 also acts to inhibit entry of debris and small objects into the region of rollers 27, 28, 29 and 31.

While the invention has been described with respect to a specific preferred embodiment for purposes of example, many variations and modifications of the construction are possible and it is not intended to limit the invention except as defined in the following claims.

I claim:

1. A track assembly for facilitating movement of a hand truck on stairs or the like, said hand truck being of the type which has a frame for supporting loads, said frame having an upper portion and a lower end, ground wheels at the lower end of the frame and hand grips attached to an upper portion of the frame, wherein said track assembly comprises:

a pair of parallel spaced apart side plates having front and back ends of rounded configuration and which are a greater length than height, each of said plates having front and back and upper and lower regions and front and back and upper and lower edges, a plurality of rollers situated between said side plates and being journalled thereto and having fixed rotational axes that are normal to said plates, wherein said rollers include a front roller located between the front regions of said side plates and being spaced from said front edges thereof, a back roller located between the back regions of said side plates and being spaced from said back edges thereof, a plurality of spaced apart lower rollers situated along the lower regions of said side plates and being spaced from said lower edges thereof and a plurality of spaced apart upper rollers situated along the upper regions of said side plates and being spaced from said upper edges thereof, wherein said rollers in conjunction with said edges of said side plates define a continuous belt guideway extending along said front and back and upper and lower regions of said side plates, an endless back seated in said guideway and having an inner surface which is within said guideway and which continuously contacts each of said rollers within said guideway and an outer surface which is outside of said guideway along each of said front back and upper lower regions of said side plates, said inner surface being out of contact with said side plates, and means for securing said track assembly to said hand truck at a location where the track assembly extends rearwardly along said frame behind said ground wheels.

2. The apparatus of claim 1 wherein said belt has a predetermined thickness and said front and back and upper and lower rollers are each equidistantly spaced from said front and back and upper and lower edges, respectively, of said side plates by a distance which is less than the thickness of said belt.

3. The apparatus of claim 1 wherein said side plates have linear lower edges extending between said rounded front and back ends thereof and upwardly bowed arcuate upper edges extending between said rounded front and back ends thereof and wherein said front and back and upper and lower rollers are spaced from the front and back and upper and lower edges, respectively, of said side plates by equal distances.

4. The apparatus of claim 1 wherein said front and back rollers each have a diameter smaller than the height of said side plates and wherein said upper and lower rollers have diameters smaller than the diameters of said front and back rollers, wherein said upper rollers are positioned to contact said belt at a series of first locations between said side plates and said lower rollers are positioned to contact said belt at a series of second locations between said side plates, the vertical spacing between said first locations and said second locations being greater than he diameter of said front and back roller.

5. The apparatus of claim 1 wherein each of said side plates has an inner side which faces the other of said side plates and an outer side which faces away from the other of said side plates, each of said side plates further having a plurality of apertures, said apertures being located at the said rotational axes of said rollers and wherein said rollers have axles which extend into separate ones of said apertures of each of said side plates, further including a pair of outer plates each being disposed against the outer side of a separate one of said side plates and covering said apertures thereof, and means for securing said side plates and outer plates to each other.

6. The apparatus of claim 1 wherein said upper rollers include first and second rollers which are closest to said front and back rollers, respectively, and a third roller which is furthest from said front and back rollers, said first and second rollers being journalled to said side plates at a lower location thereon than said third roller whereby said belt guideway has an upwardly bowed arcuate configuration along the top region of said side plates.

7. A track assembly for facilitating movement of a hand truck on stairs or the like, said hand truck being of the type which has a frame for supporting loads, said frame having an upper portion and a lower end, ground wheels at the lower end of the frame and hand grips attached to the upper portion of the frame, wherein said track assembly comprises:

a pair of parallel spaced apart side plates having front and back ends of rounded configuration and which are of greater length than height, each of said plates having front and back and upper and lower regions and front and back and upper and lower edges and wherein each of said side plates has an inner side which faces the together of said side plates and an outer side which faces away from the other of said side plates, each of said side plates further having a plurality of apertures, a plurality of rollers situated between said side plates and being journalled thereto and having fixed rotational axes that are normal to said plates, wherein said rollers includes a front roller located between the front regions of said side plates and being spaced from said front edges thereof, a back roller located between the back regions of said side plates and being spaced from said back edges thereof, a plurality of spaced apart lower rollers situated along the lower regions of said side plates and being spaced from said lower edges thereof and a plurality of spaced apart upper rollers situated along the upper regions of said side plates and being spaced from said upper edges thereof, wherein said rollers in conjunction with said edges of said side plates define a continuous belt guideway extending along said front and back and upper and lower regions of said side plates, wherein said rollers have axles at said rotational axes thereof that extend into separate ones of said apertures of each of said side plates a pair of outer plates each being disposed against the outer side of a separate one of said side plates and covering said apertures thereof, plate securing means for securing said side plates and outer plates to each other, wherein said means for securing said side plates and outer plates to each other extends between each of said plates at a location which is substantially midway between the axes of said front and back rollers, an endless belt seated in said guideway and having an inner surface which continuously contacts each of said rollers within said guideway, said inner surface being out of contact with said side plates, and means for securing said track assembly to said hand truck at a location where the track assembly extends rearwardly along said frame behind said ground wheels wherein said side plates and outer plates each have a first opening situated substantially midway between said plate securing means and the axis of said front roller and a second opening situated substantially midway between said plate securing means and the axis of said back roller, further including a first tubular spacer having end portions extending into said first opening of each of said plates and a central portion of greater diameter which seats against the inner surfaces of said side plates, and a second tubular spacer having end portions extending into said second opening of each of said plates and a central portion of greater diameter which seats against said inner surfaces of said side plates, each of said spacers having an axial passage for receiving bolts to attach said track assembly to said hand truck.

8. Apparatus for facilitating travel of a hand truck on stairs or the like, said truck having a load supporting frame which has a base, a pair of ground wheels at the base of the frame and hand grip means for manually holding said frame in a semi-upright orientation during travel, said apparatus comprising:

a pair of track assemblies each being secured to said frame behind a separate one of said ground wheels and extending backward therefrom, each of said track assemblies having a pair of spaced apart parallel flat side plates which have front and back ends and front and back and upper and lower edges, a plurality of rollers situated between said side plates and which are journalled to said side plates for rotation about fixed parallel axes of rotation that are normal to said side plates, said rollers including front and back end rollers located near said front and back ends of said side plates, a series of lower rollers located near the lower edges of said side plates and a series of upper rollers located near the upper edges of said side plates, said rollers being positioned to define a continuous belt guideway in conjunction with said front and back and upper and lower edges of said side plates, and wherein each of said track assemblies further includes an endless belt seated in said guideway along the entire length of the belt and having an inner surface that is in continuous contact with each of said rollers within said guideway and which is free of contact with said side plates, said belt having an outer surface that is outside said guideway along the entire length of the belt.

9. The apparatus of claim 8 wherein said front and back end rollers have a diameter that is smaller than the diameter of said ground wheels and said upper and lower series of rollers have a still smaller diameter, the axes of rotation of said upper rollers being vertically spaced from the axes of rotation of said lower rollers by a distance which exceeds said diameter of said front and back end rollers.

10. The apparatus of claim 8 wherein said endless belt has a predetermined thickness and wherein said side plates of each of said track assemblies have rounded front and back edges, a linear lower edge extending between said front and back edges and an upwardly bowed upper edge extending between said front and back edges, and wherein said front and back end rollers and upper and lower rollers are spaced from the front and back and upper and lower edges, respectively, of said side plates by a distance which is less than the thickness of said belt.

* * * * *